(12) United States Patent
Camenisch et al.

(10) Patent No.: US 8,527,777 B2
(45) Date of Patent: Sep. 3, 2013

(54) CRYPTOGRAPHIC PROOFS IN DATA PROCESSING SYSTEMS

(75) Inventors: Jan L. Camenisch, Thalwil (CH); Thomas R. Gross, Zurich (CH); Thomas S. Heydt-Benjamin, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 13/194,069

(22) Filed: Jul. 29, 2011

(65) Prior Publication Data

US 2012/0204035 A1 Aug. 9, 2012

(30) Foreign Application Priority Data

Jul. 30, 2010 (CH) .................................. 10171430

(51) Int. Cl.
*G06F 21/00* (2006.01)
(52) U.S. Cl.
USPC ...................................................... 713/186
(58) Field of Classification Search
USPC ...................................................... 713/186
See application file for complete search history.

(56) References Cited

U.S. PATENT DOCUMENTS

| | | | | |
|---|---|---|---|---|
| 4,993,068 A * | 2/1991 | Piosenka et al. | | 713/186 |
| 7,454,624 B2 | 11/2008 | LaCous | | |
| 7,614,551 B2 | 11/2009 | Kingsley-Hefty | | |
| 7,787,661 B2 | 8/2010 | Le Saint et al. | | |
| 8,281,149 B2 * | 10/2012 | Laurie et al. | | 713/185 |
| 2006/0282681 A1 * | 12/2006 | Scheidt et al. | | 713/186 |
| 2007/0220274 A1 * | 9/2007 | Jensen et al. | | 713/186 |
| 2010/0039223 A1 | 2/2010 | Siedlarz | | |
| 2010/0135542 A1 | 6/2010 | Keepper, Jr. et al. | | |
| 2011/0138450 A1 * | 6/2011 | Kesanupalli et al. | | 726/7 |

FOREIGN PATENT DOCUMENTS

WO 2010080020 A1 7/2010

OTHER PUBLICATIONS

Bhargav-Spantzel et al., "Biometrics-Based Identifiers for Digital Identity Management", Apr. 2010, ACM, pp. 84-97.*
Bhargav-Spantzel et al., "Privacy Preserving Multi-Factor Authentication with Biometrics", Nov. 2006, ACM, pp. 63-71.*
M Blanton, WMP Hudelson, Biometric-Based Non-Transferable Anonymous Credentials, Information and Communications Security 2009, pp. 165-180, Springer-Verlag Berlin Heidelberg 2009.
Russell Impagliazzo, Sara Miner More, Anonymous Credentials with Biometrically-Enforced Non-Transferability, Proceedings of the 2003 ACM Workshop on Privacy in the Electronic Society, pp. 60-71, University of California, San Diego, La Jolla, CA 2003.
Gerrit Bleumer, Biometric yet Privacy Protecting Person Authentication, Information Hiding 1998, pp. 99-110, LNCS 1525, Springer-Verlag, Berlin Heidelberg 1998, AT&T Research Labs, NJ.

* cited by examiner

*Primary Examiner* — Matthew Smithers
(74) *Attorney, Agent, or Firm* — Jordan IP Law, LLC (57) ABSTRACT

A prover of a data processing system may prove to a verifier of the system that the prover satisfies a condition imposed by the verifier. The prover holds in memory at least one cryptographic credential in which are encoded a biometric template characteristic of the prover and a set of prover attributes such that each of the template and attributes are bound to a common secret value of the prover. A biometric measurement is made of the prover, which then communicates with the verifier to make a cryptographic proof demonstrating: possession of the cryptographic credential; that the biometric measurement matches the biometric template encoded in the cryptographic credential; and that the set of prover attributes encoded in the cryptographic credential satisfies the condition imposed by the verifier. The cryptographic proof is made without revealing the template or the at least one credential to the verifier.

17 Claims, 3 Drawing Sheets

PROVER  VERIFIER $$\rho_e \in_R \pm \{0,1\}^{l_e + l_\phi + l_H}$$

$$\rho_v \in_R \pm \{0,1\}^{l_v + l_\phi + l_H}$$

$$\rho_{m_j} \in_R \pm \{0,1\}^{l_m + l_\phi + l_H}$$

$$t_Z \leftarrow (A')^{\rho_e} \left(\prod_{i=1}^{k} R_j^{\rho_{m_j}}\right) (S^{\rho_v})$$

$$t_{C_{m_j}} \leftarrow g^{\rho_{m_j}} h^{\rho_{r_j}}$$

$$t_{C'_{m_j}} \leftarrow C_{m_j}^{\rho_{m_j}} h^{\rho_{r'_{m_j}}}$$

$$t_{\delta_j} \leftarrow h^{\rho_{r_{\delta_j}} - \rho_{r'_{m_j}} - 2a\rho_{m_j}}$$

$$t_\Delta = \frac{h^{\rho_{r_\Delta}}}{\prod_{i=1}^{k}(h^{\rho_{r_{\delta_i}}})}$$

$$\xrightarrow{\text{Tvalues}}$$

$$c \in_R \{0,1\}^{l_c}$$

$$\xleftarrow{c}$$

$$s_e \leftarrow \rho_e + ce'$$

$$s_v \leftarrow \rho_v + cv'$$

$$s_{m_j} \leftarrow \rho_{m_j} - cm_j$$

$$s_{r_j} \leftarrow \rho_{r_j} + cr_j$$

$$s_{r'_{m_j}} \leftarrow \rho_{r'_{m_j}} + cr'_{m_j}$$

$$s_{r_{\delta_j}} \leftarrow \rho_{r_{\delta_j}} + cr_{\delta_j}$$

$$s_{r_\Delta} \leftarrow \rho_{r_\Delta} + cr_\Delta$$

CRYPTOGRAPHIC PROOFS IN DATA PROCESSING SYSTEMS

BACKGROUND

One or more embodiments of this invention relate generally to cryptographic proofs in data processing systems wherein a prover needs to prove to a verifier of the system that the prover satisfies a condition imposed by the verifier. Methods, apparatus and computer programs are provided for use in such systems and by provers and verifiers thereof.

There are numerous applications in which a proving entity (the "prover") needs to prove certain information to a verifying entity (the "verifier"), where in general such an entity may comprise one or more individuals and/or devices interacting via some form of data processing system. For security or privacy-sensitive applications, cryptographic credentials are often employed in such proofs. A cryptographic credential is essentially a certificate generated via a cryptographic process by an issuing entity (the "issuer") who has in some manner verified the information for which the credential is issued. This information is cryptographically encoded in the credential to certify the correctness of the information. The holder of a credential can then use the credential to make proofs to a verifier, via various cryptographic proof protocols, about the information encoded in the credential. In particular, cryptographic proofs can be made about the information encoded in the credential to demonstrate that the prover satisfies some condition imposed by the verifier. Such a condition typically relates to some requirement that the prover must satisfy in order to access a service, facility or other resource to which access is controlled by the verifier. Common applications include government or electronic ID cards which encode personal or other security-sensitive information about which proofs may need to be made for a variety of purposes. Here, a user might present his ID card to a terminal device of the verifier whereupon a processor on the card communicates with the terminal device to prove that some condition is satisfied, e.g. that the user's age as encoded in the credential is within a required range or that required information has been correctly disclosed to the verifier. There are also numerous applications involving access to resources via data communications networks such as the Internet. An exemplary system here might involve a user with a laptop, mobile phone, PDA (personal digital assistant) or other data processing device in communication with a remote server via the Internet, with verification of information via an appropriate cryptographic credential being required before the user is permitted access to a restricted web site.

Information can be encoded in cryptographic credentials in a variety of ways. In general, however, information to be certified by a credential is represented by some value or function which is then encoded in the credential via a cryptographic algorithm. The items of information certified by cryptographic credentials are referred to generally herein as "attributes". Such an attribute can be any item of information attributed to a prover, relating, for example, to some property, quality, feature or other item belonging to, describing or otherwise associated with the prover. Cryptographic proof protocols then permit proofs to be made about encoded attributes. For privacy and security reasons, such proofs ideally keep the actual information disclosed to the verifier to a minimum. So-called "anonymous credentials", for example, allow zero-knowledge (ZK) proofs to be made which do not reveal to a verifier any other information about prover attributes than that which is to be proved.

Cryptographic credentials, and in particular anonymous credential systems, offer powerful prover-centric control over disclosure of prover attributes. Consider the simple example of a user, carrying a credential on an ID card, who enters an age-restricted zone like a night-club and uses his anonymous credential at an entry terminal to prove an inequality over his age (e.g. "I am 21 or older"), without revealing his actual date of birth. The user reveals only the information necessary to satisfy the entry condition, and the anonymity set of the user is the set of all people holding credentials who are at least 21 years of age. However, this simple scenario reveals a difficulty with credential systems generally. That is, the entry terminal cannot verify that the ID card, and hence the credential used in the proof of age, actually belongs to the holder.

The particular problem of identity authentication forms the basis of biometrics. Biometrics provides techniques for recognizing individuals based on distinguishing physical or behavioural traits. Briefly, biometry for authentication consists of two main phases: enrollment and authentication. During enrollment, a series of measurements is made during which a physical or behavioural property (biometric) of the prover is measured repeatedly. These measurements are then processed to derive a biometric template. This template is characteristic of the prover on whom the measurements were made and is essentially a mathematical expression approximating what makes the prover distinct from other individuals. In the second, authentication phase, the prover reveals his template to the verifier along with some authority's signature on the template. The prover then exposes his relevant physical or behavioural biometric to a measurement device trusted only by the verifier. The verifier compares the resulting biometric measurement (the "observation"), after appropriate processing, with the prover's template. If the new biometric measurement matches the template (according to some predetermined matching criterion, typically that a calculated difference between the measurement and template does not exceed a threshold value), then the prover is judged to be the same individual and the identity authentication succeeds.

A problem with the basic biometric technique just described is that the template is quite sensitive private information. After all, it is the template which approximates as closely as possible a unique characterization of the prover's physical or behavioural qualities. A number of techniques have been proposed to address this fundamental problem with biometric authentication. One technique, known as "fuzzy matching", involves the transformation of the prover's biometric template with a one-way function such that only the output of this function is disclosed to the verifier. A similar function is applied to the new biometric measurement made by the verifier to transform the measurement for comparison with the transformed template.

Another proposed solution to the above problem is usually called "match on chip" or "match on card". With this system the prover provides a biometric, typically a fingerprint, directly to a trusted prover device such as a specially-constructed identity card or PDA-like device which carries the prover's biometric template. Since this hardware is trusted by both prover and verifier, and since this trusted device alone is exposed to the biometric information, this suffices for an authentication without revealing any prover information to the verifier. While this is an excellent solution for many circumstances, the need for special biometric hardware which, along with its cryptographic functionality, is trusted by both prover and verifier has both practical and cost implications inhibiting widespread application.

Another technique to address privacy in biometric authentication is described in "Privacy-preserving Similarity Evaluation and Application to Remote Biometrics Authentication", Kikuchi et al., MDAI 2008, LNAI 5285, pp. 3-14, 2008. In this system, a user registers his biometric template in encoded form with an authentication server. The user inputs a new biometric measurement to a hardware device trusted by both prover and verifier. The hardware device then communicates with the authentication server to make a zero-knowledge proof that the new measurement matches the registered template without revealing the new measurement to the server.

BRIEF SUMMARY

One embodiment of an aspect of the present invention provides a method for proving to a verifier of a data processing system that a prover satisfies a condition imposed by the verifier. The method includes: holding in memory of the prover at least one cryptographic credential having encoded therein a biometric template characteristic of the prover and a set of prover attributes such that each of said template and attributes are bound to a common secret value of the prover; making a biometric measurement of the prover; and at the prover, communicating with the verifier to make a cryptographic proof demonstrating (a) possession of said at least one cryptographic credential, (b) that said biometric measurement matches the biometric template encoded in said at least one credential, and (c) that the set of prover attributes encoded in said at least one credential satisfies said condition imposed by the verifier; wherein the cryptographic proof is made without revealing the template or said at least one credential to the verifier.

In methods embodying this invention, therefore, a prover holds at least one cryptographic credential encoding the prover's biometric template and also encoding one or more prover attributes about which condition proofs may need to be made to a verifier. The template and attributes are bound via said at least one credential to a common secret value of the prover, typically a secret cryptographic key (a "master key") of the prover which is encoded in the credential(s). The prover can then use the credential(s) to make an efficient proof, via steps (a) to (c) above, demonstrating not only that the prover's attributes satisfy the condition imposed by the verifier, but also that the prover is the genuine holder of the credential(s) and thus truly possesses the attributes in question. The binding of the prover's attributes and biometric template in cryptographic credential(s) thus may enable attribute proofs to be made while ensuring that only the genuine holder can use the credential(s). Moreover, by exploiting the capabilities of cryptographic credential proofs, all this may be achieved without revealing the credential(s) or the template to the verifier. This may permit effective privacy preservation. In particular, aside from inherent sensitivity of the prover's template, revealing the template or a credential in the transaction between prover and verifier would provide the verifier with a static pseudonym for the prover, i.e. an unchanging bit-string that would be part of all biometrically verified transactions, allowing the verifier to identify different transactions with the same prover. Even if, as in biometric systems discussed above, the template were distorted by an encoding process, the distorted variant would still become a pseudonym, linking successive transactions and therefore introducing a tracing mechanism. In contrast, with methods embodying the present invention, the necessary facts can be proved while ensuring unlinkability of prover transactions. A level of prover privacy equivalent to that of match-on-chip systems may be thus achieved without necessitating use of specialized, verifier-trusted prover hardware. Embodiments of the invention may thus provide secure, efficient and eminently practical systems for implementing authenticated prover attribute proofs.

In some embodiments of the invention, the at least one credential may comprise a single credential which encodes the biometric template, the prover attributes and the secret value (e.g. the master key) of the prover. In this case, therefore, the template and attributes are bound together in the same credential. In other embodiments, the at least one credential may comprise a plurality of credentials each encoding the secret value of the prover. Thus, the template and attributes can be distributed over more than one credential and bound via these credentials to the same master key.

For maximum privacy in embodiments of the invention, the cryptographic proof may be a zero-knowledge proof. This may be conveniently achieved using an anonymous credential system whereby the credential encoding the template and prover attributes is an anonymous credential. The prover thus makes a biometrically-verified proof that the encoded attributes satisfy the condition imposed by the verifier without revealing anything other than is necessary to effect the proof.

The overall condition imposed by the verifier may in general comprise one or more component conditions. In some applications the condition might simply be that certain information is correctly revealed to the verifier, e.g. that information disclosed to the verifier corresponds to prover attributes encoded in credential. In some cases the condition may be predetermined and known to the prover in advance of a transaction. In other cases the condition may be specified by the verifier dynamically during a transaction so that the prover can make an appropriate proof.

The set of prover attributes in the credential may in general comprise one or more attributes, and the prover's biometric template might be encoded in the credential in a variety of ways. In preferred embodiments, the template is defined by a set of further attributes which is encoded in the credential similarly to the set of prover attributes about which condition proofs are made. The credential can therefore encode a first attribute set specifying prover attributes for use in proofs that the prover satisfies a verifier's condition, and a further set of attributes which defines the template. The template can thus be encoded like any other attributes in the attribute credential.

The prover and verifier may in general comprise any form of data processing device, component or system. The prover might consist solely of such a device, component or system or may be represented by one or more individuals in addition to data processing hardware. A typical scenario might involve a person whose biometric template is encoded in the credential and a user device such as a personal computer, PDA or chip card which holds the credential in memory and communicates with the verifier to perform the cryptographic proof. The communication, cryptography and credential storage functions of the prover may be implemented by more than one device. For instance, the credential might be stored on a memory device and the communications and/or cryptographic functions might be performed by a user device which can interface with the memory device to access the credential.

Biometrics can also be applied to machinery as well as people. Operational characteristics of a device, for example, might be used just like personal characteristics to generate a biometric template which can be used subsequently for device authentication. In some embodiments of the present invention, therefore, the credential may encode attributes and template of a prover mechanism rather than person. In particular, the prover may comprise a prover mechanism of the data processing system, the biometric template being characteristic of the prover mechanism, and the method may include: making the biometric measurement of the prover mechanism; and, at the prover mechanism, communicating with the verifier to make the cryptographic proof. If the prover mechanism comprises a plurality of devices, the template might relate to any or all of these devices and the biometric measurement will be made accordingly.

In some embodiments, the biometric measurement may be made at a measurement device of the verifier and then communicated to the prover for use in the cryptographic proof. In other embodiments, the biometric measurement could be made at a measurement device of the prover which is trusted by the verifier. The cryptographic proof can then be made without revealing the biometric measurement to the verifier. This is discussed further below.

An embodiment of a second aspect of the invention provides a prover mechanism of a data processing system for proving to a verifier of the system that a prover, comprising the prover mechanism, satisfies a condition imposed by the verifier. The prover mechanism comprises a communications interface for communicating with the verifier and control logic adapted to: receive a biometric measurement of the prover; and communicate with the verifier via the communications interface to make a cryptographic proof demonstrating (a) possession of at least one cryptographic credential having encoded therein a biometric template characteristic of the prover and a set of prover attributes such that each of the template and attributes are bound to a common secret value of the prover, (b) that the biometric measurement matches the biometric template encoded in the at least one credential, and (c) that the set of prover attributes encoded in the at least one credential satisfies the condition imposed by the verifier; wherein the control logic is adapted to make the cryptographic proof without revealing the template or the at least one credential to the verifier.

An embodiment of a third aspect of the invention provides a verifier of a data processing system for verifying that a prover satisfies a condition imposed by the verifier. The verifier comprises a communications interface for communicating with the prover and control logic adapted to: receive a biometric measurement of the prover; and communicate with the prover via the communications interface to effect a cryptographic proof demonstrating (a) possession by the prover of at least one cryptographic credential having encoded therein a biometric template characteristic of the prover and a set of prover attributes such that each of the template and attributes are bound to a common secret value of the prover, (b) that the biometric measurement matches the biometric template encoded in the at least one credential, and (c) that the set of prover attributes encoded in the at least one credential satisfies the condition imposed by the verifier; wherein the cryptographic proof is made without revealing the template or the at least one credential to the verifier.

An embodiment of a fourth aspect of the invention provides a computer program comprising program code means for causing a prover computer of a data processing system to perform a method for proving to a verifier of the system that a prover, comprising the prover computer, satisfies a condition imposed by the verifier, the method comprising: receiving a biometric measurement of the prover; and communicating with the verifier to make a cryptographic proof demonstrating (a) possession of at least one cryptographic credential having encoded therein a biometric template characteristic of the prover and a set of prover attributes such that each of the template and attributes are bound to a common secret value of the prover, (b) that the biometric measurement matches the biometric template encoded in the at least one credential, and (c) that the set of prover attributes encoded in the at least one credential satisfies the condition imposed by the verifier; wherein the cryptographic proof is made without revealing the template or the at least one credential to the verifier.

An embodiment of a fifth aspect of the invention provides a computer program comprising program code means for causing a verifier computer of a data processing system to perform a method for verifying that a prover satisfies a condition imposed by the verifier computer, the method comprising: receiving a biometric measurement of the prover; and communicating with the prover to effect a cryptographic proof demonstrating (a) possession by the prover of at least one cryptographic credential having encoded therein a biometric template characteristic of the prover and a set of prover attributes such that each of the template and attributes are bound to a common secret value of the prover, (b) that the biometric measurement matches the biometric template encoded in the at least one credential, and (c) that the set of prover attributes encoded in the at least one credential satisfies the condition imposed by the verifier; wherein the cryptographic proof is made without revealing the template or the at least one credential to the verifier computer.

It will be understood that the term "computer" is used in the most general sense and includes any device, component or system having a data processing capability for implementing a computer program. Moreover, a computer program embodying one or more embodiments of the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

In general, where features are described herein with reference to an embodiment of one aspect of the invention, corresponding features may be provided in embodiments of another aspect of the invention.

BRIEF DESCRIPTION OF THE SEVERAL VIEWS OF THE DRAWINGS

Preferred embodiments of the invention will now be described, by way of example, with reference to the accompanying drawings in which.

DETAILED DESCRIPTION

The embodiment of the invention detailed below employs a cryptographic credential system based on Camenisch-Lysyanskaya signatures. These are described in detail in: "A Signature Scheme with Efficient Protocols", J. Camenisch and A. Lysyanskaya, in S. Cimato, C. Galdi and G. Persiano editors, Security in Communications Networks, Third International Conference, SCN 2002, volume 2576 of Lecture Notes in Computer Science, pages 268-289, Springer Verlag, 2003;

and "Efficient non-transferable anonymous multi-show credential system with optional anonymity revocation", J. Camenisch and A. Lysyanskaya, in B. Pfitzmann, editor, Advances in Cryptology—EUROCRYPT 2001, volume 2045 of Lecture Notes in Computer Science, pages 93-118, Springer Verlag, 2001. A brief description of the properties of Camenisch-Lysyanskaya signatures is given below to assist understanding of the embodiment to be described.

Assumptions

Strong RSA Assumption (See "A method for obtaining Digital Signatures and public-key Cryptosystems", R. L. Rivest, A. Shamir, L. Adleman, Communications of the ACM, 21(2):120-126. February 1978.): given an RSA modulus n and a random element $g \chi Z^*_n$, it is hard to compute $h \chi Z^*_n$ and integer $e>1$ such that $h^e \equiv g \bmod n$. The modulus n is of a special form pq, where $p=2p'+1$ and $q=2q'+1$ are safe primes.

Integer Commitments

We recall the Pederson commitment scheme (as detailed in "Non-interactive and Information-theoretic Secure Verifiable Secret Sharing", T. P. Pedersen, in J. Feigenbaum, editor, Advances in Cryptology—CRYPTO '91, volume 576 of Lecture Notes in Computer Science, pages 129-140, Springer Verlag, 1992) in which the public parameters are a group G of prime order q, and generators $(g_0, \ldots, g_m)$. In order to commit to the values $(v_0, \ldots, v_m) \chi Zq$, pick a random $r \chi Zq$ and set $C = \mathrm{Com}(v_0, \ldots, v_m; r) = g_0^r \prod_{i=1}^m g_i^{v_i}$.

Damgård and Fujisaki ("An integer commitment scheme based on groups with hidden order", I. Damgård and E. Fujisaki, http://eprint.iacr.org/2001, 2001) show that if the group G is an RSA group and the committer is not privy to the factorization of the modulus, then in fact the Pedersen commitment scheme can be used to commit to integers of arbitrary size.

Discrete-Logarithm-Based, Zero-Knowledge Proofs

The Camenisch-Lysyanskaya signature scheme makes use of several known results for proving statements about discrete logarithms. When referring to such proofs, we will follow the notation introduced by Camenisch and Stadler ("Efficient Group Signature Schemes for Large Groups", J. Camenisch and M. Stadler, in B. Kaliski, editor, Advances in Cryptology—CRYPTO '97, volume 1296 of Lecture Notes in Computer Science, pages 410-424, Springer Verlag, 1997) for various proofs of knowledge of discrete logarithms and proofs of the validity of statements about discrete logarithms. For instance, $$PK\{(\alpha,\beta,\delta) : y = g^\alpha h^\beta {}_{\mathrm{AND}} \tilde{y} = \tilde{g}^\alpha \tilde{h}^\delta {}_{\mathrm{AND}} (u < \alpha < v)\}$$

denotes a "zero-knowledge" Proof of Knowledge of integers $\alpha$, $\beta$, and $\delta$ such that $y = g^\alpha h^\beta$ and $\tilde{y} = \tilde{g}^\alpha \tilde{h}^\delta$ holds, where $u < \alpha < v$ and where $y, g, h, \tilde{y}, \tilde{g}, \tilde{h}$ are elements of some groups $G = \langle g \rangle = \langle h \rangle$ and $G = \langle \tilde{g} \rangle = \langle \tilde{h} \rangle$. The convention is that Greek letters denote quantities of which knowledge is being proved, while all other values are known to the verifier. We apply the Fiat-Shamir heuristic ("How to prove yourself: Practical solutions to identification and signature problems", A. Fiat and A. Shamir, in A. M. Odlyzko, editor, Advances in Cryptology—CRYPTO '86, volume 263 of Lecture Notes in Computer Science, pages 186-194. Springer Verlag, 1987) to turn such proofs of knowledge into signatures on some message m; denoted as, for example, $SPK\{(\alpha) : y = g^\alpha\}(m)$. Given a protocol in this notation in the following description, the derivation of an actual protocol implementing the proof will be apparent to those skilled in the art.

Camenisch-Lysyanskaya Signatures

We present here a minor and straightforward variant of the Camenisch-Lysyanskaya (CL) signatures discussed in "A Signature Scheme with Efficient Protocols" (referenced in full above) which allows messages to be negative integers as well. Let $l_m$, $l_e$, $l_n$, $l_r$ and L be system parameters ($l_r$ is a security parameter, and the meanings of the others will become apparent in the following).

Key generation: on input $l_n$, choose an $l_n$-bit RSA modulus n such that $n=pq$, $p=2p'+1$, $q=2q'+1$, where p, q, p', and q' are primes. Choose, uniformly at random, $R_0, \ldots, R_{L-1}$, S, $Z \chi QR_n$. Output the public key $(n, R_0, \ldots, R_{L-1}, S, Z)$ and the secret key p.

Message space is the set $\{(m_0, \ldots, m_{L-1}): m_i \chi \{0,1\}^{l_m}\}$.

Signing algorithm: on input $m_0, \ldots, m_{L-1}$, choose a random prime number e of length $l_e > l_m + 2$, and a random number v of length $l_v = l_n + l_m + l_r$, where $l_r$ is a security parameter. Compute $$A = \left(\frac{Z}{R_0^{m_0} \ldots R_{L-1}^{m_{L-1}} S_v}\right)^{\frac{1}{e}} \bmod n.$$

The signature consists of (e, A, v).

Verification algorithm: to verify that the tuple (e, A, v) is a signature on message $(m_0, \ldots, m_{L-1})$, check that $Z \equiv A^e R_0^{m_0} \ldots R_{L-1}^{m_{L-1}} S^v \pmod{n}$, and $2^{l_e} > e > 2^{l_e-1}$ holds.

Proving Knowledge of a Signature: a prover can prove possession of a CL signature without revealing any other information about the signature. If A was a public value, we could do so by proving knowledge representation of Z with respect to $R_0, \ldots, R_{L-1}$, S and A. However, making A public would destroy privacy as that would make all transactions linkable. Luckily, one can randomize A: given a signature (A, e, v), the tuple $(A' := AS^{-r} \bmod n, e, v' := v+er)$ is also a valid signature as well. Now, provided that $A \chi \langle S \rangle$ and that r is chosen uniformly at random from $\{0,1\}^{l_n+l_\phi}$ the value is distributed statistically close to uniform over $Z^*_n$. Thus, the user could compute a fresh A' each time, reveal it and then run the protocols $$PK\{(\epsilon, v', \mu) : Z \equiv \pm R_0^{\mu_0} \ldots R_{L-1}^{\mu_{L-1}} A'^\epsilon S^{v'} \pmod{n} \wedge \mu_i \in \pm \{0,1\}^{l_m} \wedge \epsilon \in [2^{l_e-1}+1, 2^{l_e}-1]\}$$

Now, there is a technical consequence from this proof protocol regarding the statements $\mu_i \in \pm \{0,1\}^{l_m} \wedge \epsilon \in [2^{l_e-1}+1, 2^{l_e}-1]$. While these can be implemented virtually for free, they may require that the actual secret lie in a smaller interval, i.e. the signer needs to choose e from $[2^{l_e-1}-2^{l'_e}+1, 2^{l_e-1}+2^{l'_e}-1]$ with $l'_e < l_e - l_\phi - l_H - 3$ where $l_\phi$ and $l_H$ are security parameters (the first controlling statistical zero-knowledge and the second being the size of the challenge message in the PK protocol). Similarly, we may require $m_i \in \pm \{0,1\}^{l_m - l_\phi - l_H - 2}$ when input to the signature scheme.

Figure 1:
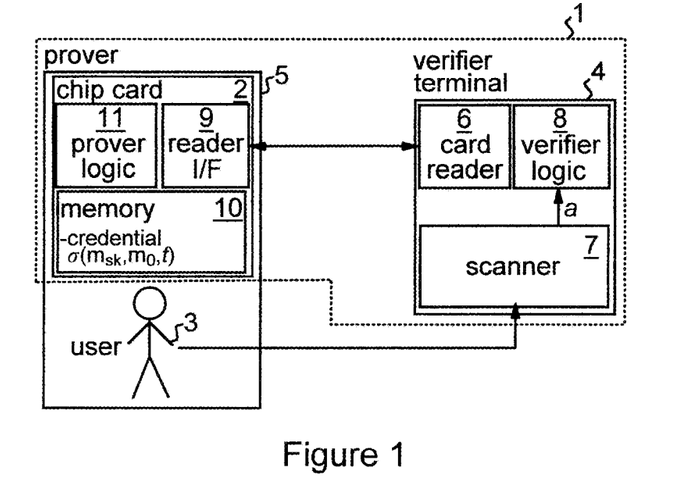
FIG. 1 is a schematic representation of a system implementing a proof method embodying the invention.

FIG. 1 is a simplified schematic of an exemplary system for implementing a proof method embodying the invention. A data processing system of this example is indicated generally at 1 and consists of a prover mechanism and a verifier mechanism which are adapted for data communications with one another. The prover mechanism here is implemented by a processor-bearing card ("chip card") 2, which is carried by a user 3. The verifier mechanism is implemented by a verifier terminal device 4. Chip card 2 and user 3 together represent the "prover", as indicated at 5, in the proof process to be described, with verifier terminal 4 representing the "verifier".

Verifier terminal 4 includes a communications interface in the form of card reader 6 for (wired or wireless) data communication with chip card 2. The verifier terminal also includes a measurement device 7 for making a biometric measurement of prover 5. In this example, measurement device 7 is a fingerprint scanner. Verifier logic 8 of terminal 4 controls operation of the terminal generally and includes logic for implementing the verifier functionality in the proof process to be described. Similarly, chip card 2 includes a communications interface, here reader interface 9, for (wired or wireless) data communications with the verifier terminal via card reader 6. A tamper-proof processor of card 2 includes memory 10 and prover logic 11. Memory 10 provides secure storage for a cryptographic credential σ issued to user 3 as described in more detail below. Prover logic 11 controls operation of the card generally and implements the prover functionality of the proof process to be described. In general, the prover and verifier logic 11, 8 may be implemented in hardware or software or a combination thereof. In this example, however, logic 11, 8 is implemented by respective computer programs configuring processors of the associated devices to perform the functions described. Suitable software will be apparent to those skilled in the art from the description herein.

The cryptographic credential σ held in memory 10 of chip card 2 encodes a set of attributes associated with user 3. For simplicity of description, the credential of this example encodes a single user attribute denoted by $m_0$. In other embodiments, however, a plurality of attributes might be encoded in credential σ. The credential σ also encodes a biometric template t which is characteristic of user 3. In this example, the template t defines characteristics of a fingerprint of the user 3. As usual with cryptographic credentials, the credential σ also encodes a secret cryptographic key, denoted here by $m_{sk}$, of the user. The credential σ is issued to the user in generally known manner by an issuer authority referred to hereafter as the "identity provider" (IDP). The credential might be supplied to the user on chip card 3 or could be transmitted to the user for storage on an existing chip card of the user. To obtain the credential, the user 3 supplies the IDP with information about personal attribute $m_0$, the secret user key $m_{sk}$ and a template t sufficient for the IDP to produce a signature σ on these values which can be tested at a later time. The template t might be generated by a biometric enrollment procedure conducted with the IDP or could be obtained from another authority and supplied to the IDP. This template can be generated in known manner by a variety of techniques. In the present example, without loss of generality, the template is represented by a k-dimensional tuple where $k \geq 2$. This is derived during enrolment from a series of measurements of the user's fingerprint. Each measurement is reduced to a feature vector (a simple list of numbers), and the feature vectors are then combined by the enrolment authority to derive the k-dimensional template t characteristic of the user.

In operation of system 1, the user 3, wishing to access some service or other resource controlled by verifier 4, must prove to the verifier that he satisfies the verifier's access condition. This is achieved by proving that the user is the genuine holder of a credential encoding an attribute set which satisfies the relevant condition imposed by the verifier. A variety of such conditions might be envisaged in general, from complex conditions about multiple user attributes to a simple condition that certain information is correctly disclosed to the verifier. The particular condition imposed by the verifier is orthogonal to the operation to be described. As a simple illustration, however, we assume here that the user attribute $m_0$ defines the user's date of birth and that the access condition is that the user must be at least 21 years of age.

Figure 2:
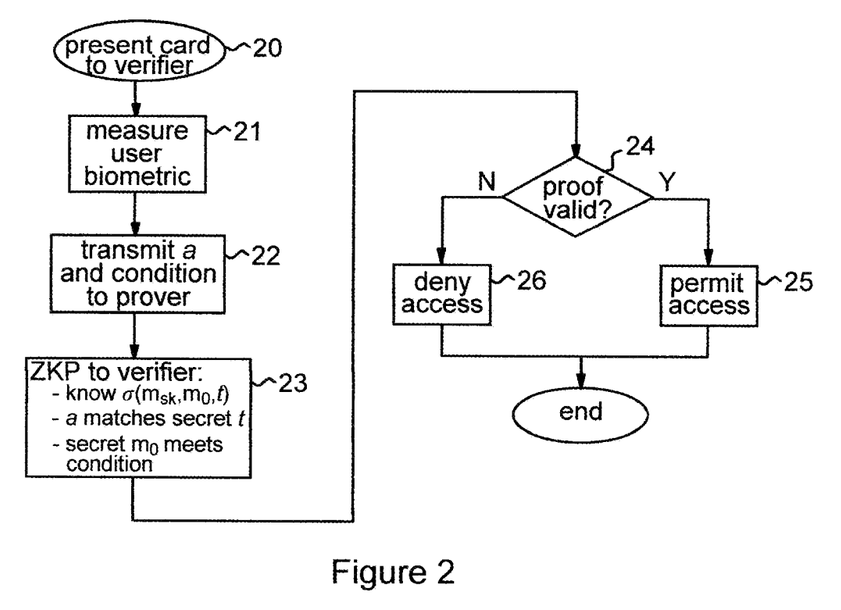
FIG. 2 indicates key steps in operation of the FIG. 1 system.

FIG. 2 indicates the key steps of the proof process conducted between prover 5 and verifier 4 in the FIG. 1 system. Operation commences when user 3 presents his card 2 to the verifier terminal 4 as represented by step 20 in FIG. 2. The verifier terminal 4 then makes a measurement of the relevant user biometric in step 21. In the present example, the user's fingerprint is scanned by scanner 7 of terminal 4. The resulting measurement (denoted here by a) produced by scanner 7 is, like the template t, a k-dimensional vector of numbers in this instance. The measurement a is output by scanner 7 to verifier logic 8. Next, in step 22, the verifier logic transmits the biometric measurement a, together with details of the access condition (here the age requirement) to be satisfied by the user, to prover logic 11 via the communications interfaces 6 and 9. In step 23, prover logic 11 and verifier logic 8 then communicate via interfaces 6, 9 to engage in a zero-knowledge proof (ZKP) that the user satisfies the verifier's access condition. The proof protocol will be described in more detail later. Briefly, however, the proof demonstrates three key facts to verifier 4 as set out below.

Firstly, the proof demonstrates that prover 5 possesses a (valid) credential a encoding a secret user attribute $m_0$, secret prover key $m_{sk}$ and a secret user template t. This can be done in generally known manner for anonymous attribute credentials as detailed further below. Secondly, the proof demonstrates that the biometric measurement a matches the secret template t encoded in the credential σ. As described above, the template t and measurement a are each represented by a k-dimensional tuple in this example. Hence, the template t and measurement a can be seen as respective k-dimensional coordinates defining points in a k-space. In the case of a Euclidean space, the normal distance between these points can then be calculated by prover logic 11 using the normal distance equation. Prover logic 11 can demonstrate that the new biometric measurement a matches the template t encoded in his credential by proving that the distance between the two k-dimensional coordinates does not exceed a predetermined threshold, denoted here by $\tau^2$. This threshold may be predetermined for the biometric system, or could be specified by verifier 4 and transmitted to prover logic 11 in step 22. In any case, if the calculated distance is no greater than threshold distance $\tau^2$, then the biometric measurement a is deemed similar to the template t, whereby the user 3 is deemed to be the correct individual and the identity authentication succeeds.

The third component of the proof in step 23 is to demonstrate that the verifier's access condition is satisfied by the user attributes encoded in credential σ. In the present scenario, this involves proving that the user's data of birth as defined by attribute m0 proves him to be 21 or older. This can be done using known techniques for attribute proofs about anonymous credentials. Note that the proof is made without revealing the user's data of birth (secret attribute $m_0$) per se. Indeed, since the cryptographic proof of step 23 is a zero knowledge proof, the entire proof is made without prover logic 11 revealing to verifier logic 8 anything other than the key facts to be proved. The proof is therefore made without revealing the credential σ, the biometric template t, the attribute $m_0$, or any other unnecessary information.

In decision step 24 of FIG. 2 the verifier logic 8 decides if the proof is valid, i.e. if the necessary facts have been proved by the prover logic 11. If so, then in step 25 the user 3 is permitted access to the resource in question. If not, then the user is refused access in step 26. The operation is then complete.

An exemplary proof protocol for use in step 23 of FIG. 2 will now be described in more detail. This protocol employs an anonymous credential system based on Camenisch-Lysyanskaya (CL) signatures as introduced earlier. Note that the protocol described relates specifically to the proof that a biometric measurement a matches a secret template t in a secret credential σ. In particular, features of the step 23 proof relating to proving that the prover knows secret key $m_{sk}$ in the credential and that attribute $m_0$ satisfies the verifier's access condition are omitted. The details of such an attribute proof will in general depend on the particular attribute set and condition to be satisfied thereby. Such proofs can be implemented using generally known techniques for proofs about Camenisch-Lysyanskaya (CL) signatures, and suitable implementations for a given scenario will be apparent to those skilled in the art.

Common Inputs.

The common inputs to the scheme are as follows:

k is the number of dimensions of the k-space in which the template is expressed;

let n be a strong RSA modulus;

let (n, $R_{sk}$, $R_0$, $R_1$, $R_2$, ..., $R_{k+1}$) with $R_i \chi QR_n$ be the IDP's public signature key. Note that, in this example, $R_{sk}$ is reserved as the public key base for the user's secret key $m_{sk}$ and $R_0$ is the public key base for the user's secret attribute (here date of birth) $m_0$;

$(a_1, \ldots, a_k)$ is the biometric measurement in k-space known to both prover and verifier;

PT is the threshold such that the biometric measurement is considered to match the template if and only if it is no more distant than this threshold;

let (n, g, h) be the public key of a DF (Damgård and Fujisaki) commitment scheme modulo n.

IDP's Inputs.

Let the factorization pq=n be the IDP's secret signature key.

Prover's Inputs.

Let $(m_{sk}, m_0, \ldots, m_k)$ be the attributes of a message block signed with valid CL signature tuple σ=(A, e, v) in which:

$m_{sk}$ is the user's secret key $m_{sk}$;

$m_0$ represents the user's secret attribute;

the tuple $(m_1, \ldots, m_k)$ is the k-dimensional template t known only to the prover.

Let $$\Delta' = \sqrt{\sum_{i=1}^{k}(m_i - a_i)^2}$$

be the ordinary distance between the template values $(m_1, \ldots, m_k)$ and the measured values $(a_1, \ldots, a_k)$ of a biometric measurement a.

Let $\Delta = \Delta'^2$.

The Protocol.

The prover computes and then transmits the following values:

$A' = AS^{-r_A}$ for secret $r_A \in_R \{0,1\}^{l_n + l_\phi}$ $v' = v + er_A$

For i=1 to k $C_{m_i} = g^{m_i} h^{r_{m_i}}$ $C_{m'_i} = g^{m_i^2} h^{r_{m'_i}}$ $C_{\delta_i} = g^{m_i^2 - 2m_i a_i + a_i^2} h^{r_{\delta_i}}$ $C_\Delta = g^\Delta h^{r_\Delta} = g^{\sum_{i=1}^{k}(m_i^2 - 2m_i a_i + a_i^2)} h^{r_\Delta}$ The prover also computes but does not transmit $e' = e - 2^{l_e - 1}$ The prover and the verifier then engage in:

$$PK\Big\{(\{m_1, \ldots, m_k\}, \{r_{m_1}, \ldots, r_{m_k}\}, \{r_{m'_1}, \ldots, r_{m'_k}\}, \{r_{\delta_1}, \ldots, r_{\delta_k}\},$$

$$r_\Delta, e : Z \equiv \pm A'^e S^{v'} \prod_{i=1}^{k} R_i^{m_i} \wedge C_{m_i} = g^{m_i} h^{r_{m_i}} \wedge_{i=1}^{k} C_{m'_i} =$$

$$(C_{m_i})^{m_i} h^{r_{m'_i}} \wedge_{i=1}^{k} \frac{C_{\delta_i}}{C_{m'_i} C_{m_i}^{-2a} g^{a_i^2}} \equiv \pm\left(h^{r_{\delta_i} - r_{m'_i} - 2a_i r_{m_i}}\right) \wedge_{i=1}^{k}$$

$$\frac{C_\Delta}{\prod_{i=1}^{k} C_{\delta_i}} = \frac{h^{r_\Delta}}{\prod_{i=1}^{k}(h^{r_{\delta_i}})} \wedge (\tau^2 - \Delta > 0) \wedge m_i \in$$

$$\{0,1\}^{l_m + l_\phi + l_H + 2} \wedge_{i=1}^{k} e - 2^{l_e - 1} \in \{0,1\}^{l'_e + l_\phi + l_H + 2}\Big\}(\text{mod } n)$$

(Note that the proof of the distance Δ uses a standard interval proof method, a predominant example of which is provided by Boudot's range proof ("Efficient proofs that a committed number lies in an interval", F. Boudot, in Preneel, B. (ed.) EUROCRYPT 2000, LNCS, vol. 1807, pp. 431-444, Springer, Heidelberg, 2000).

Figure 3A:
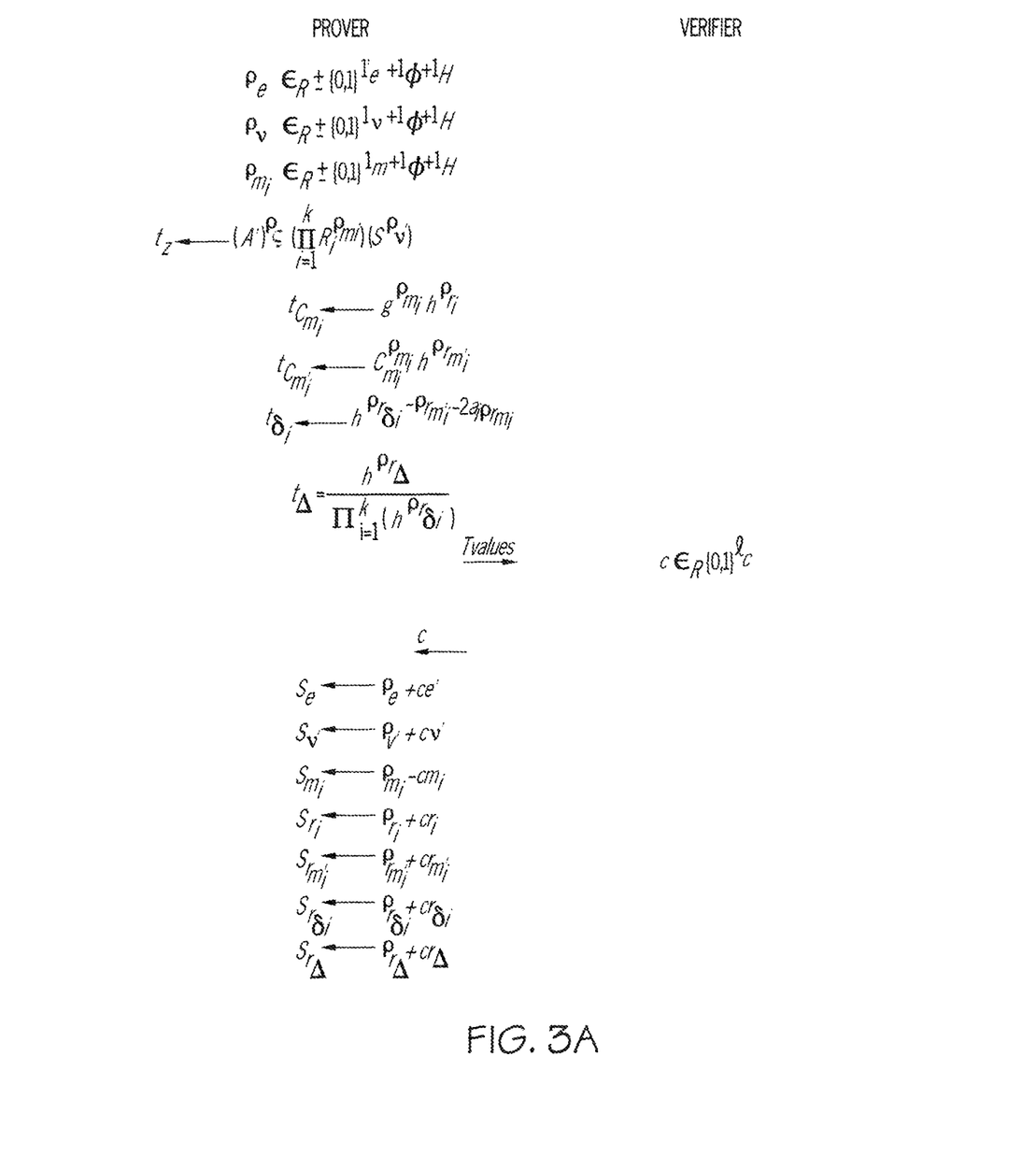
FIGS. 3a and 3b illustrate steps of a cryptographic proof protocol performed in operation of the FIG. 1 system.
Figure 3B:
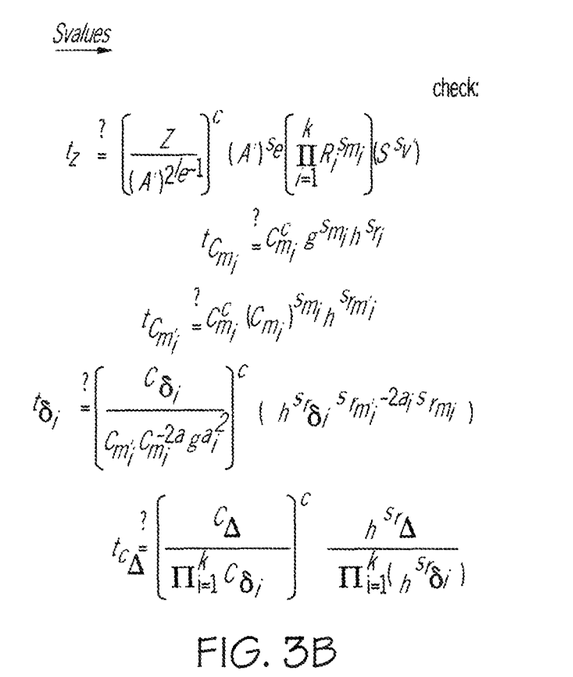

FIGS. 3a and 3b illustrate in more detail protocol steps performed by the prover 5 on the left of the figure and the verifier 4 on the right. In the first stage shown in FIG. 3a, prover logic 11 calculates the values $\rho_e$, $\rho_{v'}$ and $\rho_{m_i}$ as indicated, together with a set of "T values" listed as $t_Z$ to $t_\Delta$. The T values are then transmitted to verifier logic 8 which calculates $c \in_R \{0,1\}^{l_c}$. The verifier logic returns c to prover logic 11 which then calculates the set of "S values" $s_e$ to $s_{r_\Delta}$ as indicated. In FIG. 3b, prover logic transmits the S values to verifier logic 11. The verifier logic then performs the checks itemized in the remainder of FIG. 3b to confirm validity of the proof (where all simple length checks are omitted here for clarity).

It will be seen that the embodiment described provides an efficient system for proving to the verifier that the prover satisfies a condition imposed by the verifier. The prover's biometric is bound to the prover attributes with the secret user key $m_{sk}$ in the credential such that proofs can be made that the prover's attributes satisfy the condition imposed by the verifier while ensuring that only the genuine holder can use the credential. The verifier learns only that the prover, as testified by his attribute credential, satisfies the verifier-imposed condition, and does not learn any other information about the prover's attributes. The system also satisfies the condition for unlinkability: in the absence of external information, two transactions involving a particular credential are only linkable to the degree that the user-chosen disclosed information permits. Different transactions of the prover are thus unlinkable, and user privacy is fully protected. Moreover, the system can exploit existing zero-knowledge proof capability built into a card suitable for anonymous credentials, and can therefore be implemented at lower cost than typical match-on-card systems which require specialized trusted hardware.

Figure 4:
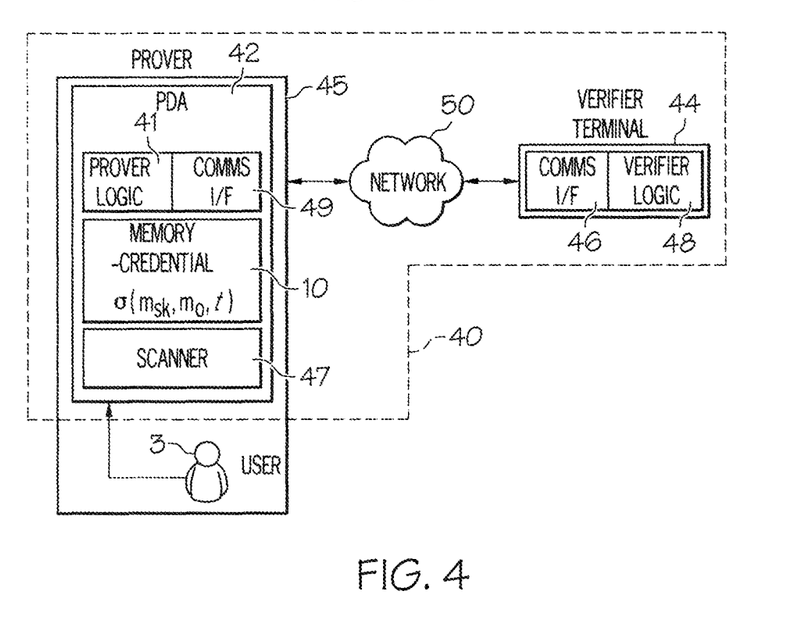
FIG. 4 a schematic representation of an alternative system for implementing proof methods embodying the invention.

Various alternative embodiments can of course be envisaged. One example is illustrated in FIG. 4. The system 40 of this figure is generally similar to the FIG. 1 system, and like components are indicated by like reference numerals. Operation is generally similar to the system already described, but in this system the measurement device, in the form of scanner 47, forms part of the prover 45. In particular, the prover mechanism here is implemented by a PDA device 42 with built-in scanner 47. Prover logic 41 of device 42 is adapted to communicate with logic 48 of verifier terminal 44 via communications interfaces 49, 46. Interfaces 49, 46 are adapted to communicate over a data communications network 50 in this scenario. With this system, the user 3 can input his biometric measurement a directly to his PDA device 42. This device is trusted by verifier 44 as a biometric reader. The measurement a is received by prover logic 41 and is not revealed to verifier logic 48. Instead, the prover logic generates a commitment on the input measurement and communicates this commitment to verifier logic 48. The zero-knowledge proof performed by prover logic 41 then demonstrates that the secret biometric measurement committed to in the aforementioned commitment matches the secret template t as before.

The prover's attributes and biometric template are bound via a single credential in the above embodiments. In other embodiments, the template and attributes can be distributed over more than one credential. In this case, each credential will encode the prover's master key $m_{sk}$ so that the template and prover attributes are bound via the credentials to the same master key $m_{sk}$. Appropriate modification of the above embodiments to accommodate multiple credentials bound to the same master key will be readily apparent to those skilled in the art.

Various further changes and modifications can be envisaged. For example, other biometrics such as iris scans, facial images, voice or handwriting samples might be employed. Also, when calculating the distance in biometry between a measured biometric and a template, the "distance" may not be ordinary Euclidean distance and various distance functions might be employed accordingly as will be apparent to those skilled in the art.

Some embodiments of the invention might employ machine biometry. In particular, the attribute credential and biometric template might be associated with a prover machine rather than an individual. One or more operational characteristics of the prover machine (whether device, component, or system) can be used to generate a biometric template characteristic of the machine, with an appropriate biometric measurement being made for comparison purposes and hence machine authentication. Examples of possible operational characteristics here include frequency, timing or power fingerprints.

If desired, the issuing process can be performed without the IDP learning the user's template and/or attributes or his secret key $m_{sk}$. For example, the user can supply the IDP with commitments to the template, key $m_{sk}$ and any attributes to be kept secret. The IDP then generates the credential by producing a signature σ on the commitments.

The zero-knowledge proof is interactive, involving dynamic interchange between prover and verifier in the embodiment described. However, if all necessary parameters (verifier condition, distance threshold $\tau^2$, etc.) are predetermined in a given application, then the prover may implement his side of the proof as a signature proof of knowledge. In this case, all the prover's steps are incorporated in a single signature proof which is communicated to the verifier. The verifier then has everything required to verify the proof. For security in this case, the signature proof ideally includes a signature on some random nonce or session identifier in order to prevent replay attacks. For a particular transaction, the verifier may also transmit to the prover a policy which defines the transaction parameters and enables the signature proof to be made accordingly.

The prover and verifier mechanisms in embodiments of the invention can of course be implemented by a variety of different devices in other scenarios. Credential systems other than the CL system described above might also be employed in other embodiments.

It will be appreciated that many other changes and modifications can be made to the exemplary embodiments described without departing from the scope of the invention.

We claim:

1. A method for proving to a verifier of a data processing system that a prover satisfies a condition imposed by the verifier, the method comprising:
    holding in memory of the prover at least one cryptographic credential having encoded therein a biometric template characteristic of the prover and a set of prover attributes such that each of said template and attributes are bound to a common secret value of the prover;
    making a biometric measurement of the prover; and
    at the prover, communicating with the verifier to make a cryptographic proof demonstrating
        (a) possession of said at least one cryptographic credential,
        (b) that said biometric measurement matches the biometric template encoded in said at least one credential, and
        (c) that the set of prover attributes encoded in said at least one credential satisfies said condition imposed by the verifier;
    wherein the cryptographic proof is made without revealing the template or said at least one credential to the verifier.

2. A method according to claim 1, wherein said at least one credential comprises a single credential encoding the template, the set of prover attributes and said secret value of the prover.

3. A method according to claim 1, wherein said at least one credential comprises a plurality of credentials each encoding said secret value of the prover.

4. A method according to claim 1, wherein said secret value of the prover comprises a secret cryptographic key.

5. A method according to claim 1, wherein said at least one credential is an anonymous credential and wherein the cryptographic proof is a zero-knowledge proof.

6. A method according to claim 1, including making said biometric measurement at a measurement device of the verifier and communicating the measurement to the prover for use in said cryptographic proof.

7. A method according to claim 1, including making said biometric measurement at a measurement device of the prover which is trusted by the verifier, wherein said cryptographic proof is made without revealing the biometric measurement to the verifier.

8. A method according to claim 1, wherein the prover comprises an individual and a prover mechanism of the data processing system and wherein the biometric template is characteristic of said individual, the method including:
    making the biometric measurement of said individual;
    receiving the biometric measurement at said prover mechanism; and
    at the prover mechanism, communicating with the verifier to make said cryptographic proof.

9. A method according to claim 1, wherein the prover comprises a prover mechanism of the data processing system and wherein the biometric template is characteristic of said prover mechanism, the method including:
  making the biometric measurement of said prover mechanism; and
  at the prover mechanism, communicating with the verifier to make said cryptographic proof.

10. A method according to claim 1, wherein the biometric template and biometric measurement are represented by respective k-dimensional coordinates where $k \geq 2$, and wherein said cryptographic proof demonstrates that the biometric measurement matches the biometric template by demonstrating that the distance between said k-dimensional coordinates does not exceed a predetermined threshold.

11. A prover mechanism of a data processing system for proving to a verifier of the system that a prover, comprising said prover mechanism, satisfies a condition imposed by the verifier, wherein the prover mechanism comprises a communications interface for communicating with the verifier and control logic adapted to:
  receive a biometric measurement of the prover; and
  communicate with the verifier via said communications interface to make a cryptographic proof demonstrating
    (a) possession of at least one cryptographic credential having encoded therein a biometric template characteristic of the prover and a set of prover attributes such that each of said template and attributes are bound to a common secret value of the prover,
    (b) that said biometric measurement matches the biometric template encoded in said at least one credential, and
    (c) that the set of prover attributes encoded in said at least one credential satisfies said condition imposed by the verifier;
  wherein the control logic is adapted to make said cryptographic proof without revealing the template or said at least one credential to the verifier.

12. A prover mechanism according to claim 11, including memory storing said cryptographic credential.

13. A prover mechanism according to claim 11, including a measurement device for making said biometric measurement of the prover, wherein the control logic is adapted to make said cryptographic proof without revealing the biometric measurement to the verifier.

14. A verifier of a data processing system for verifying that a prover satisfies a condition imposed by the verifier, the verifier comprising a communications interface for communicating with the prover and control logic adapted to:
  receive a biometric measurement of the prover; and
  communicate with the prover via said communications interface to effect a cryptographic proof demonstrating
    (a) possession by the prover of at least one cryptographic credential having encoded therein a biometric template characteristic of the prover and a set of prover attributes such that each of said template and attributes are bound to a common secret value of the prover,
    (b) that said biometric measurement matches the biometric template encoded in said at least one credential, and
    (c) that the set of prover attributes encoded in said at least one credential satisfies said condition imposed by the verifier;
  wherein the cryptographic proof is made without revealing the template or said at least one credential to the verifier.

15. A verifier according to claim 14, including a measurement device for making said biometric measurement of the prover, wherein the control logic is adapted to communicate the measurement to the prover via said communications interface for use in said cryptographic proof.

16. A computer readable non-transitory medium containing executable program instructions for causing a prover computer of a data processing system to perform a method for proving to a verifier of the system that a prover, comprising said prover computer, satisfies a condition imposed by the verifier, said method comprising the steps of:
  receiving a biometric measurement of the prover; and
  communicating with the verifier to make a cryptographic proof demonstrating
    (a) possession of at least one cryptographic credential having encoded therein a biometric template characteristic of the prover and a set of prover attributes such that each of said template and attributes are bound to a common secret value of the prover,
    (b) that said biometric measurement matches the biometric template encoded in said at least one credential, and
    (c) that the set of prover attributes encoded in said at least one credential satisfies said condition imposed by the verifier;
  wherein the cryptographic proof is made without revealing the template or said at least one credential to the verifier.

17. A computer readable non-transitory medium containing executable program instructions for causing a verifier computer of a data processing system to perform a method for verifying that a prover satisfies a condition imposed by the verifier computer, the method comprising:
  receiving a biometric measurement of the prover; and
  communicating with the prover to effect a cryptographic proof demonstrating
    (a) possession by the prover of at least one cryptographic credential having encoded therein a biometric template characteristic of the prover and a set of prover attributes such that each of said template and attributes are bound to a common secret value of the prover,
    (b) that said biometric measurement matches the biometric template encoded in said at least one credential, and
    (c) that the set of prover attributes encoded in said at least one credential satisfies said condition imposed by the verifier;
  wherein the cryptographic proof is made without revealing the template or said at least one credential to the verifier computer.

* * * * *